(12) United States Patent
Bryant

(10) Patent No.: US 10,801,196 B2
(45) Date of Patent: Oct. 13, 2020

(54) STORM DRAINAGE DETENTION ASSEMBLY AND SYSTEM

(71) Applicant: Graham J. Bryant, Westfield, NJ (US)

(72) Inventor: Graham J. Bryant, Westfield, NJ (US)

(73) Assignee: Hydroworks, LLC, Roselle, NJ (US)

( * ) Notice: Subject to any disclaimer, the term of this patent is extended or adjusted under 35 U.S.C. 154(b) by 0 days.

(21) Appl. No.: 16/253,341

(22) Filed: Jan. 22, 2019

(65) Prior Publication Data

US 2019/0226192 A1    Jul. 25, 2019

Related U.S. Application Data

(60) Provisional application No. 62/620,643, filed on Jan. 23, 2018, provisional application No. 62/720,997, filed on Aug. 22, 2018.

(51) Int. Cl.
| | |
|---|---|
| *E03F 5/04* | (2006.01) |
| *E03F 1/00* | (2006.01) |
| *C02F 1/40* | (2006.01) |
| *E03F 5/10* | (2006.01) |
| *E03F 5/16* | (2006.01) |
| *F04F 10/00* | (2006.01) |
| *C02F 103/00* | (2006.01) |

(52) U.S. Cl.
CPC .............. *E03F 1/002* (2013.01); *C02F 1/40* (2013.01); *E03F 5/0403* (2013.01); *E03F 5/106* (2013.01); *E03F 5/16* (2013.01); *F04F 10/00* (2013.01); *C02F 2103/001* (2013.01); *Y10T 137/2829* (2015.04)

(58) Field of Classification Search
CPC . E03F 5/0403; E03F 5/106; E03F 5/14; E03F 5/16; B01D 17/0214; B01D 21/2444; C02F 1/40; C02F 2103/001; F04F 10/00; F04F 10/02; Y10T 137/2713
USPC ......... 210/170.03, 532.1, 538, 702; 137/123, 137/140
See application file for complete search history.

(56) References Cited

U.S. PATENT DOCUMENTS

| | | | | |
|---|---|---|---|---|
| 832,463 | A | * | 10/1906 | Engelbrecht .............. C02F 1/78 210/532.1 |
| 2,808,933 | A | * | 10/1957 | Mobley .............. B01D 17/0214 210/532.1 |

(Continued)

OTHER PUBLICATIONS

International Search Report for corresponding International Application No. PCT/US2019/14446, dated Apr. 4, 2019 (3 pages).

*Primary Examiner* — Christopher Upton
(74) *Attorney, Agent, or Firm* — Hoffmann & Baron, LLP

(57) ABSTRACT

A water detention system for detaining storm water having a side wall and a bottom floor; an inlet conduit for ingress of storm water; and a water discharging assembly, which includes a siphon, configured to pass storm water there through; and an outlet conduit for egress of storm water from the water discharging assembly. The inlet and outlet conduits are disposed through the side wall of the water detention system. A water discharging assembly for discharging storm water from a water detention system includes an outer enclosure; a first opening in the outer enclosure for ingress of water; a second opening in the outer enclosure for egress of water; and a siphon disposed within the outer enclosure; where, except of the first opening and the second opening, the outer enclosure is substantially fluid tight.

18 Claims, 6 Drawing Sheets

(56) References Cited

U.S. PATENT DOCUMENTS

| | | | |
|---|---|---|---|
| 3,347,586 A * | 10/1967 | Sharp | E02B 13/00 137/140 |
| 3,640,302 A | 2/1972 | Willinger | |
| 4,595,474 A * | 6/1986 | Greco | C25D 17/20 137/123 |
| 4,975,205 A * | 12/1990 | Sloan | B01D 21/2444 137/140 |
| 4,994,179 A | 2/1991 | Keeter et al. | |
| 5,595,457 A | 1/1997 | Stucks | |
| 5,707,527 A | 1/1998 | Knutson et al. | |
| 5,788,410 A | 8/1998 | Stucks | |
| 5,898,375 A | 4/1999 | Patterson | |
| 6,126,817 A | 10/2000 | Duran et al. | |
| 6,467,944 B2 | 10/2002 | Ugolini | |
| 7,459,090 B1 | 12/2008 | Collings | |
| 9,556,579 B2 | 1/2017 | Ahlberg et al. | |
| 2006/0006125 A1 | 1/2006 | Tolmie et al. | |
| 2011/0127204 A1 * | 6/2011 | Andoh | E03F 5/14 210/170.03 |
| 2013/0068679 A1 | 3/2013 | Hannemann et al. | |

\* cited by examiner

STORM DRAINAGE DETENTION ASSEMBLY AND SYSTEM

CROSS-REFERENCE TO RELATED APPLICATIONS

This application claims the benefit of U.S. Provisional Application Nos. 62/720,997, filed Aug. 22, 2018, and 62/620,643, filed Jan. 23, 2018, the contents of all of which are incorporated by reference herein.

FIELD OF THE INVENTION

The device, assembly, or system of the present invention is useful to detain storm water, and remove floatables (free oil, trash) and solids prior to discharging downstream to a conveyance or subsequent treatment system. This device, assembly, or system of the present invention is an improvement over current controls since it utilizes the structure's storage to detain water thereby improving removal of floatables and solids. The device may be installed in a standard catch-basin or drainage manhole, thereby utilizing existing drainage structures.

BACKGROUND OF THE INVENTION

Existing systems for detaining storm water do not have devices for enhancing water detention and removal of floatables and solids.

SUMMARY OF THE INVENTION

The present invention provides devices, assemblies, and/or systems for enhancing water detention and removal of floatables and solids.

In one aspect or embodiment of the present invention, a water detention system may comprise a side wall, a top ceiling, and a bottom floor, thereby configured to provide a holding area therein; a storm water entry for ingress of storm water into the holding area; a water discharging assembly configured to pass storm water there through, the water discharging assembly comprising a siphon; and an outlet conduit for egress of storm water from the water discharging assembly, the outlet conduit being disposed through the side wall. The water detention structure may be a catch-basin or a drainage manhole. The storm water entry may be an inlet conduit disposed through the side wall, a top opening through the top ceiling, and/or combinations thereof. During static (non-flowing storm water), a static holding area for storm water is disposed below the outlet conduit, above the bottom floor, and between portions of the side wall. During flow conditions for storm water, the siphon creates or acts as a temporary holding or storage area which is above the outlet conduit.

The water discharging assembly may further include an outer enclosure. The outer enclosure may have an opening for ingress of water from the holding area. The outer enclosure may also have an opening for egress of water into the outlet conduit. The water discharging assembly may be configured to substantially prevent water from bypassing the water discharging system and directly entering into the outlet conduit.

The outer enclosure may further include back portions. The back portions may be adjacently juxtaposed to portions of the side wall surrounding the outlet conduit. These back portions of the water discharging assembly may be sealed to portions of the side wall surrounding the outlet conduit. Alternatively or in addition to, the back portions may further include a pipe stub, where the pipe stub is configured to be disposed within the outlet conduit. In such as case, the water discharging assembly may be self-contained such that it could be inserted into the outlet conduit without fastening it to the wall, typically concrete, of the water detention structure.

The siphon may be an automatically acting siphon, such as but not limited to, a bell siphon. The siphon may include at least one internal water-receiving conduit for ingress of water, where the at least one internal water-receiving conduit has an open bottom portion for receiving water and a top portion. The siphon further may include at least one water-discharging conduit for egress of water, where the at least one water-discharging conduit has a top portion in fluid communication with the top portion of the at least one internal water receiving conduit for receiving water therefrom. The at least one water-discharging conduit may further include a discharge opening to define a discharge area for the siphon. Top wall portion of the siphon is enclosingly disposed above the top portion of the at least one internal water-receiving conduit and the top portion of the at least one water-discharging conduit. The top wall of the siphon encloses the top portions of these conduits to prevent air from entering, which may adversely affect the performance of the siphon.

While the siphon may include one water-receiving or ingress conduit and one water-discharging or egress conduit, the present invention is not so limited. The siphon may include multiple ingress conduits, such as at least two internal water-receiving conduits for ingress of water, and/or multiple egress conduits.

The siphon may further include a vertical wall opposed from a vertical wall of the water discharging assembly, thereby defining an internal space within the water discharging assembly. Water disposed within the internal space between the vertical wall of the siphon and the vertical wall of the water discharging assembly may be in fluid communication with the open bottom of the at least one internal water-receiving conduit of the siphon. The internal space between the vertical wall of the siphon and the vertical wall of the water discharging assembly may also be in fluid communication with the discharge area for the siphon. In addition, to the action of the siphon for removing water, an overflow may be provided. In such a case, the siphon may further include an internal wall having a top portion extending above the top wall portion disposed above the top portion of the at least one internal water-receiving conduit and the top portion of the at least one water-discharging conduit of the siphon to provide an overflow area for water to bypass the siphon.

In another aspect or embodiment of the present invention, a water discharging assembly for discharging storm water from a water detention system may include an outer enclosure; a first opening in the outer enclosure for ingress of water; a second opening in the outer enclosure for egress of water; and a siphon disposed within the outer enclosure. Except for the first opening and the second opening, the outer enclosure may be substantially fluid tight.

The siphon may further include at least one internal water-receiving conduit for ingress of water, the at least one internal water-receiving conduit having an open bottom portion for receiving water and a top portion. The siphon may also include at least one water-discharging conduit for egress of water, the at least one water-discharging conduit having a top portion in fluid communication with the top portion of the at least one internal water receiving conduit for receiving water therefrom, the at least one water-discharging conduit having a discharge opening to define a discharge area for the siphon. A top wall portion of the siphon is enclosingly disposed above the top portion of the at least one internal water-receiving conduit and the top portion of the at least one water-discharging conduit to provide an enclosed area, thereby preventing exposure to air which may adversely affect the performance of the siphon.

The siphon may further include a vertical wall opposed from a vertical wall of the water discharging assembly, thereby defining an internal space within the water discharging assembly. Water disposed within the internal space between the vertical wall of the siphon and the vertical wall of the outer enclosure of the water discharging assembly may be in fluid communication with the open bottom of the at least one internal water-receiving conduit of the siphon. The internal space between the vertical wall of the siphon and the vertical wall of the water discharging assembly may also be in fluid communication with the discharge area for the siphon.

These and other features and advantages of the present invention will become apparent from the following detailed description of illustrative embodiments thereof, which is to be read in connection with the accompanying drawings. Corresponding reference element numbers or characters indicate corresponding parts throughout the several views of the drawings.

DETAILED DESCRIPTION OF THE INVENTION

Figure 1:
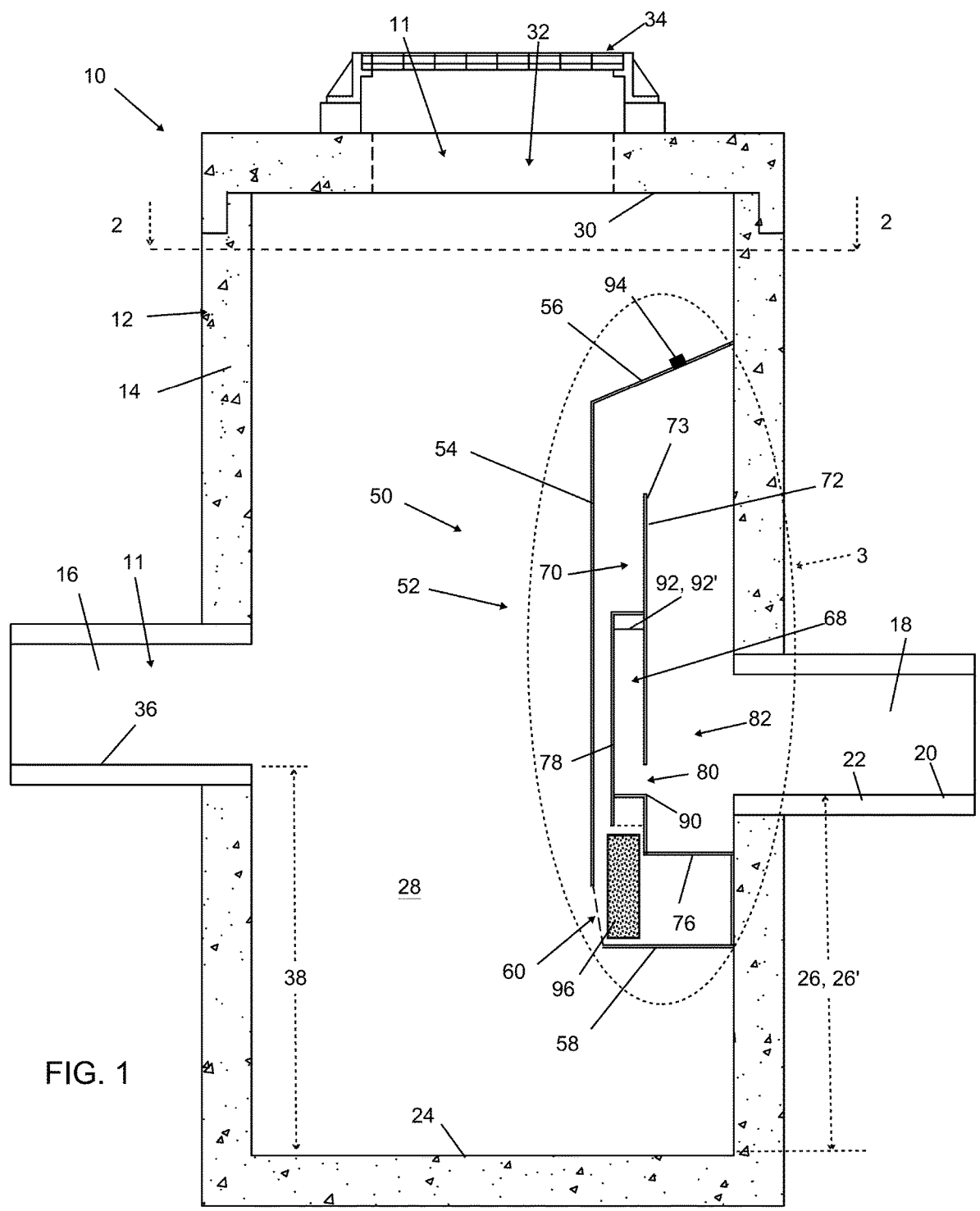
FIG. 1 is a side elevational view of a water detention system having a water discharging assembly for removal of floatables and solids from storm water according to the present invention.

FIG. 1 is a side elevational view of a water detention system 10 having a water discharging assembly 50 for removal of floatables and solids, such as but not limited to oils, trash, etc. from water, such as storm water, according to the present invention. The water detention system 10 may also be referred to as a catch-basin, drainage manhole and the like. The water detention system 10 includes a water detention structure 12 having ingress for storm water via an inlet conduit 16 and egress for treated storm water via an outlet conduit 18. These conduits 16, 18 may be in the form of pipe connectors, such as but not limited to rubber connectors or boots that are connectable or engageable with storm water piping. Storm water may also enter the water detention structure 12 via a top opening 32 of the water detention structure 12. The top opening 32 of the water detention structure 12 may further include an inlet grate 34 to prevent large floatables and/or solids from entering the water detention structure 12. Thus, the water detention system 10 includes a storm water entry 11 that may be either or both the inlet conduit 16 and top opening 32.

Water (not shown) typically enters the water detention structure 12 horizontally through the inlet conduit 16 and/or vertically from above through an inlet grate 34 of the top opening 32 into the holding area 28 of the water detention structure 12. While the drawings depict inlet and outlet conduits 16, 18 as round conduits or pipes, the present invention is not so limited. The inlet and outlet conduits 16, 18 may have any suitable configuration or shape to allow water to pass through the water detention structure 12. Further, while the inlet and outlet conduits 16, 18 are depicted as being horizontally disposed conduits, the present invention is not so limited. The inlet conduit 16 and/or the outlet conduit 18 may have sloped and/or stepped portions as long as their configurations do not substantially interfere with ingress and egress of water, including storm water.

The inlet conduit 16 and the outlet conduit 18 are typically mortared to the water detention structure 12 in the field. Thus, the inlet conduit 16 and the outlet conduit 18 are typically not integral members with the water detention structure 12, but rather are part of the overall or pipe system (not shown) for storm water. Alternatively, the inlet conduit 16 and the outlet conduit 18 may be in the form of pipe connectors, such as rubber boots or other short length members, for connecting the pipe system to the water detention structure 12.

The water detention structure 12 may include a side wall 14, a bottom portion or inside floor 24 and a top portion or ceiling 30, inter-related as shown in FIG. 1. The inside floor 24 of the water detention structure 12 will be typically lower than the outlet elevation 22 of the outlet pipe 18 by a distance or amount 26, thereby creating a sump 26' of water up to the outlet elevation 22. This depth 26 or sump 26' of water is typically 2 to 4 feet in standard inlet structures. Such a depth is non-limiting, and any suitable depth may be used. Furthermore, as depicted in FIG. 1 the elevation 38 of bottom portion 36 of the inlet pipe 16 with respect to the inside floor 24 of the water detention structure 12 is typically greater that the outlet elevation 22 or the depth 26 of the sump 26'.

Figure 3:
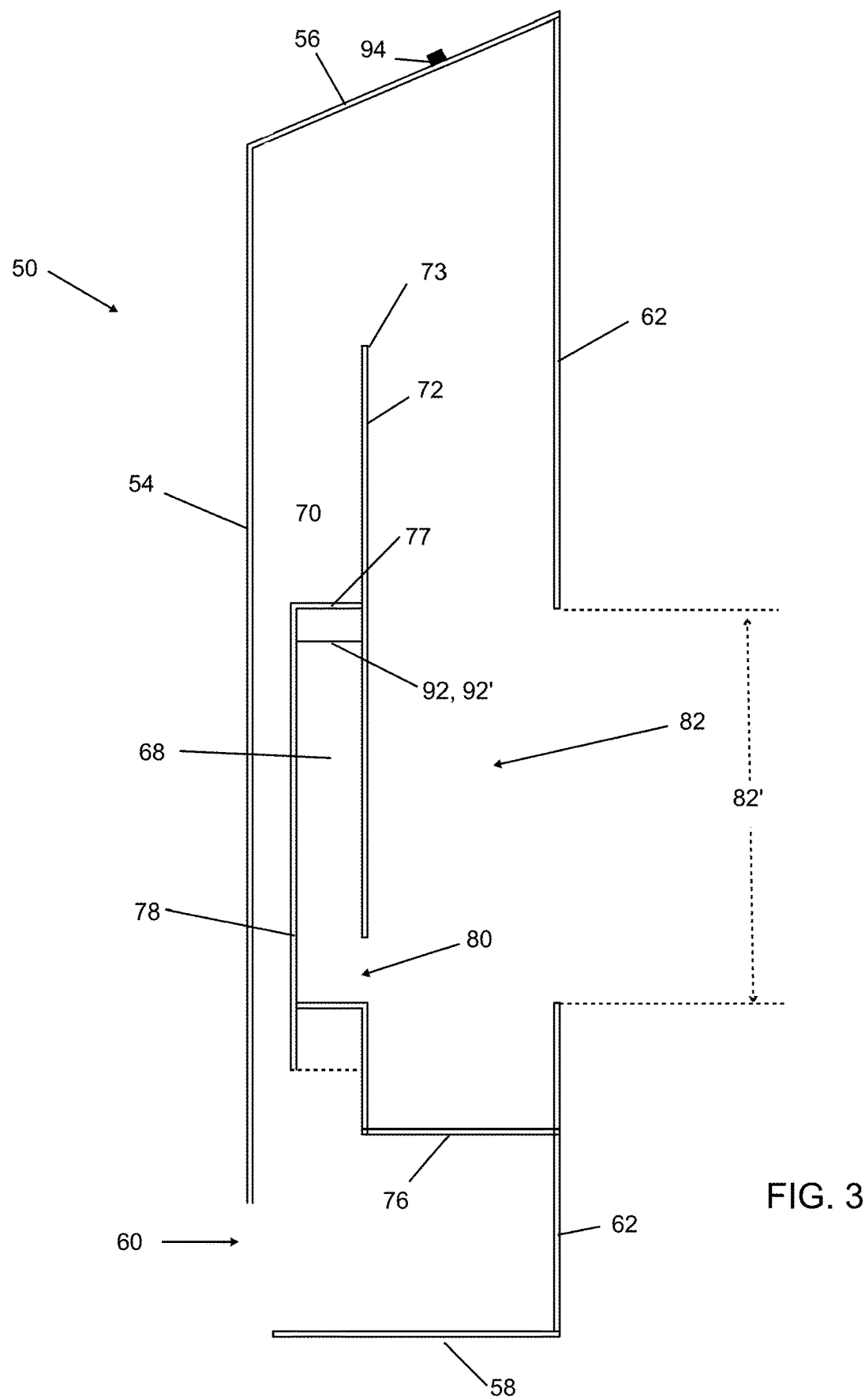
FIG. 3 is an exploded side view of the water discharging assembly of FIG. 1 taken within the dashed indication labeled 3 in FIG. 1.

Water exits the water detention structure 12 via the outlet pipe or conduit 18. Before exiting the outlet pipe or conduit 18, the water must pass or navigate through the water discharging assembly 50. The water discharging assembly 50 has an outer enclosure 52 at the side wall 14 of the water detention structure 12 having the outlet pipe or conduit 18. The outer enclosure 52 has an opening 60 to permit ingress of water of the water into the discharging assembly 50 from the holding area 28. This opening 60 may be screened to prevent debris from entering and creating blockages inside the water discharging assembly 50. The water discharging assembly 50 further includes a discharge area 82 (or opening 82' through the outer enclosure 52, preferably through the below described back portion 62 of the outer enclosure 52 as depicted in FIG. 3) for egress of water from the water discharging assembly 50 into the outlet pipe or conduit 18.

Figure 2:
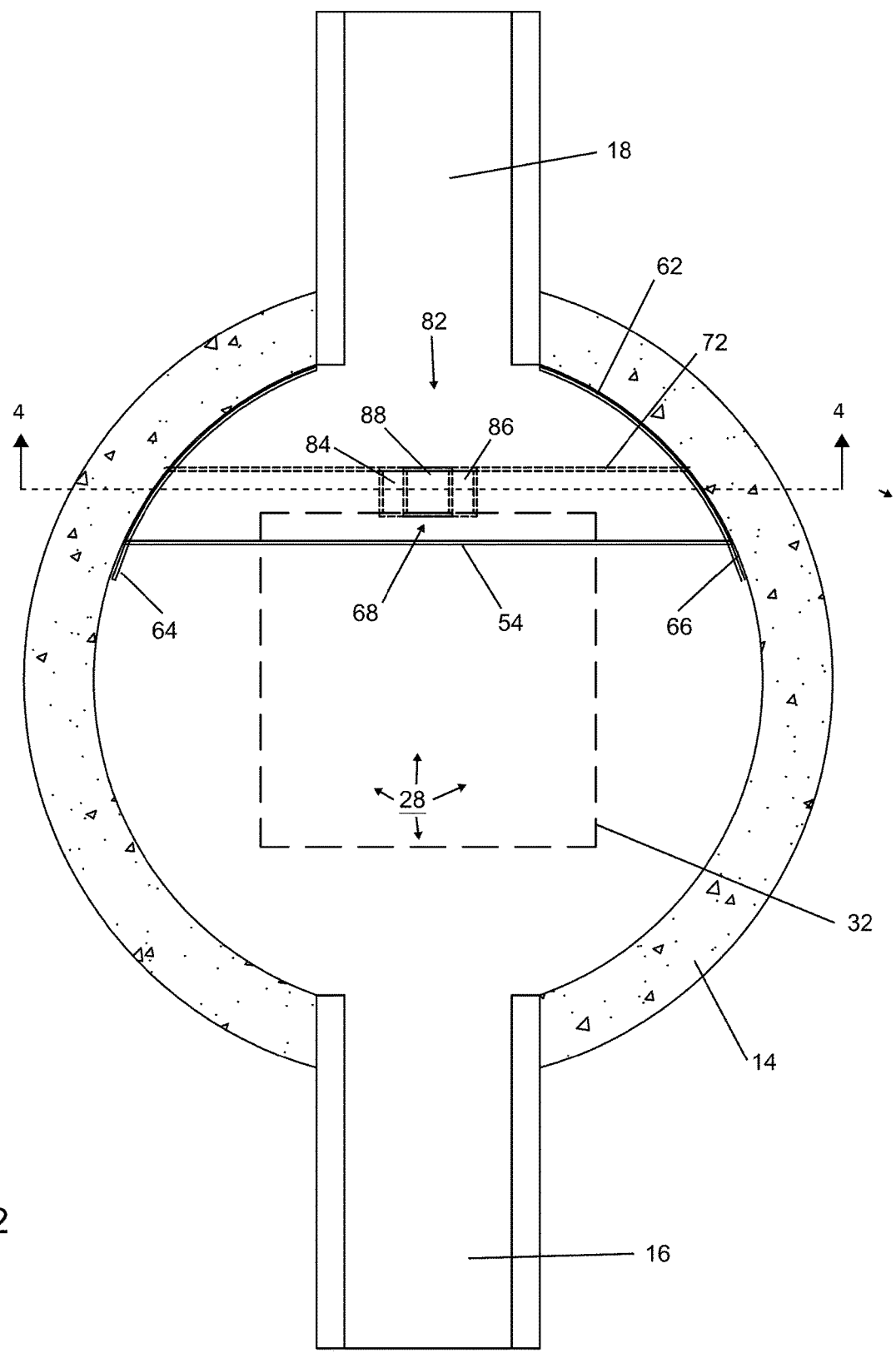
FIG. 2 is a top view of the water detention system of FIG. 1 taken along the 2-2 axis with a top opening shown in phantom.
Figure 4:
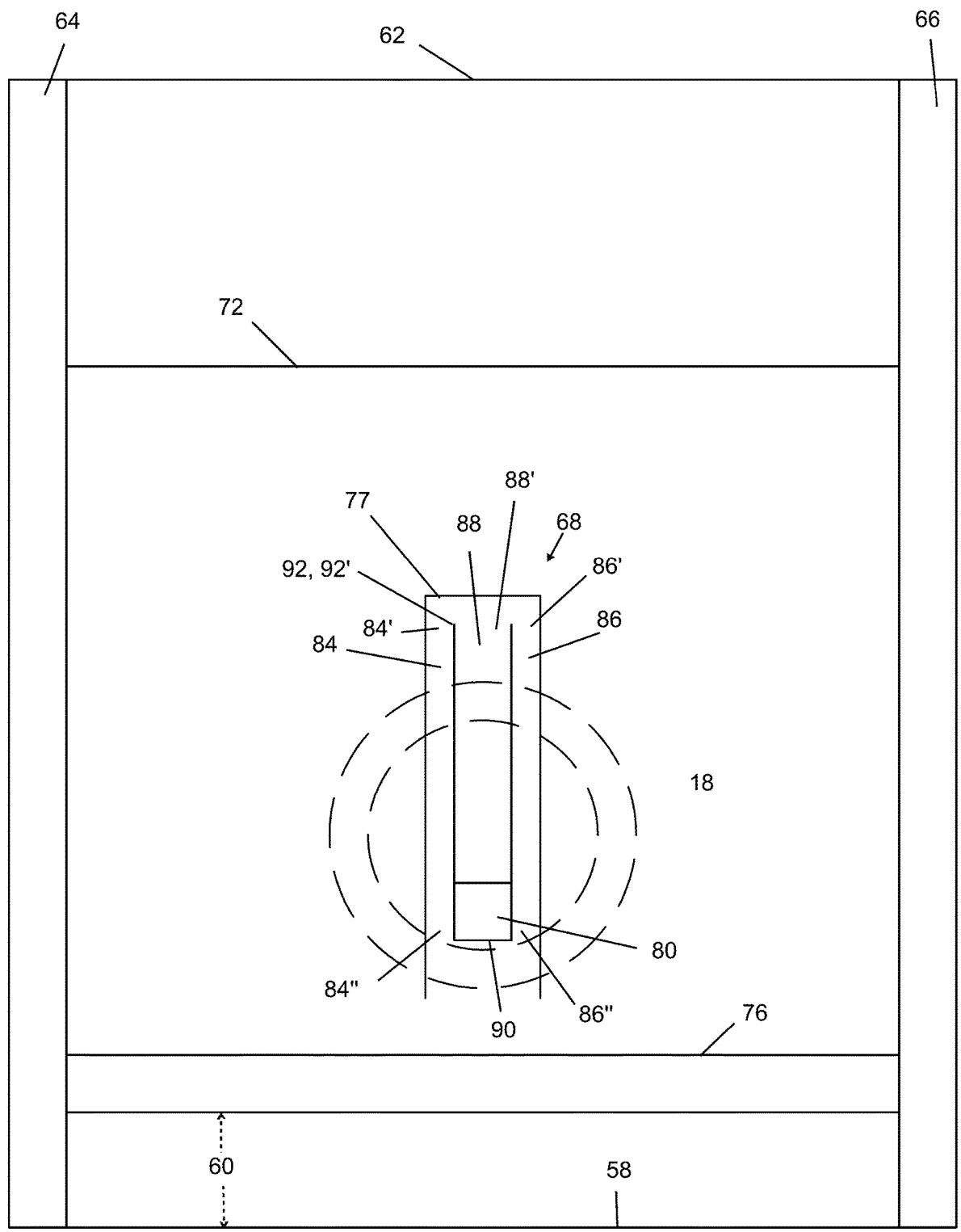
FIG. 4 is an exploded cross-sectional view of the water discharging assembly of FIG. 1.
Figure 5:
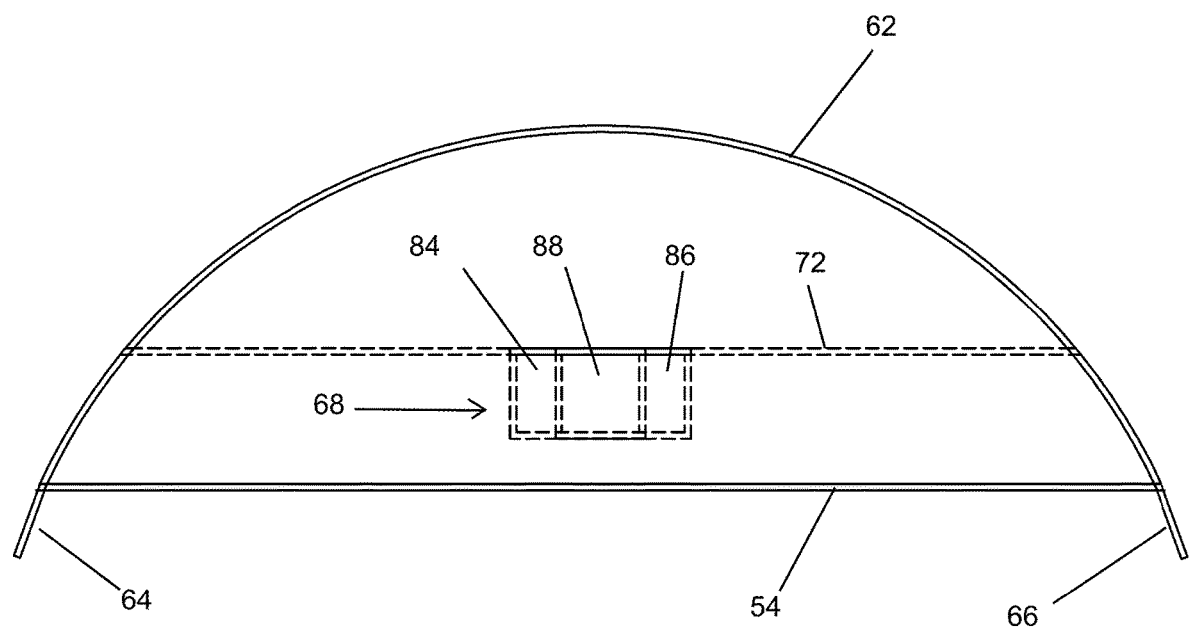
FIG. 5 is an exploded top view of the water discharging assembly of FIG. 1 taken within the dashed indication labeled 3 in FIG. 1.

As depicted in FIG. 1, the water discharging assembly 50 includes a vertical outer wall 54, a bottom portion 58, and a top portion 56 of the outer enclosure 52 of the water discharging assembly 50. These elements, among others, are further depicted in FIGS. 2-5. FIG. 2 is a top view of the water detention system of FIG. 1 taken along the 2-2 axis with a top opening shown in phantom; FIG. 3 is an exploded side view of the water discharging assembly of FIG. 1 taken within the dashed indication labeled 3 in FIG. 1; FIG. 4 is a cross-sectional view of the water discharging assembly of FIG. 3 taken along the 4-4 axis; and FIG. 5 is a top view of the water discharging assembly of FIG. 1 within the dashed indication labeled 3 in FIG. 1.

The outer enclosure 52 of the water discharging assembly 50 may further include some, all, or none of back portions 62, 64 and 66. Back portion 62 is useful if it is connected to the outlet conduit 18. In such a case the back portion 62 may include a connector, such as but not limited to the pipe stub depicted in FIG. 6, to fit over or inside of the outlet conduit 18, and back portions or flanges 64, 66 may not be required as these back portions or flanges 64, 66 are useful for, among other things, bolting the water discharging assembly 50 to the water detention structure 12. If the water discharging assembly 50 is bolted and sealed/caulked to the side walls 14, which are typically concrete walls, of the water detention structure 12, then back portions 64 and 66 are useful or required, but the back portion 62 may not be required.

When present, these back portions 62, 64 and 66 of the water discharging assembly 50 are generally disposed, such as adjacently disposed, including adjacently juxtaposed, at or near the side wall 14 of the water detention structure 12. The back portions 62, 64 and 66 may be disposed directly at or substantially proximal to the side wall 14. One consideration for the design, placement, and/or orientation of the back portions 62, 64 and 66 is that it is desirable that water from the holding area 28 substantially passes through the water discharging assembly 50 and into the outlet pipe or conduit 18 as opposed to bypassing the water discharging assembly 50 and entering the outlet pipe or conduit 18. The back portions 62, 64 and 66 need not be absolutely fluid-tight against the side wall 14 to ensure proper or adequate operation of the water detention system 10. For example, some minor water bypassing can be tolerated, such as being substantially fluid tight. As used herein, substantially fluid tight may refer to as being about 95% fluid tight or greater than 95% fluid tight (or about 5% fluid bypass or less than 5% fluid bypass), more desirably about 99% fluid tight or greater than 99% fluid tight (or about 1% fluid bypass or less than 1% fluid bypass). Desirably, the degree of fluid tightness is sufficient to prevent or substantially prevent any floatables, such as oil, etc. or solids by bypassing through the water detention system 10. Of course such potential minor water bypassing may be minimized through the use of sealants, gaskets or the like (not shown) at or between the back portions 62, 64 and 66 and the side wall 14. The back portions 62, 64 and 66 may be of unitary construction or may be different portions, or even possibly different materials, joined together or otherwise proximally disposed.

The water discharging assembly 50 further includes a siphon system 68. The siphon system 68 is useful for the egress of water from the water detention system 10 or the water discharging assembly 50 into the outlet pipe or conduit 18. Not wishing to be bound by any particular scientific principle, the siphon system 68 may be described in terms of general siphon terminology. A siphon may be considered as a tube or conduit capable of carrying water from a first container, reservoir, or area at a "high" elevation to a second container, reservoir, or area at a "lower" elevation. The siphon is primed by the water level in the first container reaching an elevation higher than the siphon elevation. Up until the top of the siphon the structure is storing water. The difference in head between the water level in the first container and water level in the second container makes water begin to flow through the siphon once the water level reaches/is higher than the height of the siphon. The area of the siphon regulates the flow rate through the device such that water is continued to be stored if the flow rate into the structure is greater than the flow rate of the siphon. Since the top of the siphon is closed a vacuum is created such that even when the water level falls below the top of the siphon water continues to flow through the siphon as long as the water level in the first container is higher than water level in the second container. Once the water levels in the containers become equal or air is allowed to reach the top of the siphon, flow through the siphon stops. Such a siphon may be referred to as a loop siphon or U-bend siphon.

One siphon useful with the present invention is a bell siphon or also known as an automatic siphon. Desirably, the bell siphon has a low profile to save space within the water detention structure 12. While not wishing to be bound by any particular theory, a bell may have a center discharge tube or conduit, also known as a standpipe, beside an inlet tube or conduit, typically having a greater length than the center outlet tube or conduit, is disposed. The inlet tube or conduit may include more than one tubes or conduits. As a container, reservoir, or area fills with water, water will rise within the bell siphon until it reaches the top of the standpipe. At that point the water will start flowing over the top of the standpipe and exiting the container, reservoir, or area. If there were no bell siphon this would just continue to overflow continuously and the water would stay at that height in the container, reservoir, or area. This is because the air pressure acting on the water in the container, reservoir, or area is equal across the whole system, i.e., it is the same pressure in the container, reservoir, or area as it is in in the standpipe. Since the inlet and outlet tubes are in fluid communication with each other but sealed from atmospheric air at the top where they communicate, as water reaches the top of the tubes air is pushed down the standpipe by the inflowing water and a vacuum is created, and water will be forced rapidly out of the container, reservoir, or area. This will typically continue until the level of water in the container, reservoir, or area reaches down to gaps at the bottom of the bell siphon and air will once again enter the bell siphon. This will cause the siphon to stop. Once the siphon has stopped then the container, reservoir, or area will simply fill up with water as before, until it reaches the top of the standpipe and the siphons automatically starts again. This process is repeated for as long as the water is entering the container, reservoir, or area. This type of siphon may be referred as an auto-siphon or automatic siphon, because, if properly designed as in the present invention and as long as water is flowing into the container, reservoir, or area; the siphon will start and finish in an automatic fashion. As used herein the phrase "fluid communication" and its variants refer to one element having a fluid (gas or liquid) pathway, either directly or indirectly, including an unobstructed or an obstructed pathway, to a second element. Such a fluid pathway may include an additional element disposed between the first and second elements.

As depicted in FIG. 4, the siphon system 68 includes internal passages, conduits, or tubes 84, 86 for the ingress of water into the siphon system 68 and a middle passage(s), conduit(s), or tube(s) 88 for the egress of water from the siphon system 68. As perhaps best shown in FIGS. 1 and 3, water may enter the opening 60 of the outer enclosure 52 and rises upward in the internal space 70 between the vertical outer wall 54 of the outer enclosure 52 and the siphon system wall 78 opposed from the vertical outer wall 54. Water will then rise upward in the internal passages, conduits, or tubes 84, 86 of water the siphon system 68. Water cannot yet enter the middle tube the middle passage(s), conduit(s), or tube(s) 88 as the internal passages, conduits, or tubes 84, 86 and 88 are sealed together and the bottom of the middle passage(s), conduit(s), or tube(s) 88 is closed by the bottom portion 90, whereas the bottom of the internal passages, conduits, or tubes 84, 86 are open. Once water in the internal passages, conduits, or tubes 84, 86 and the internal space 70 reaches a predefined or predetermined elevation 92' or the top portion 92 of the internal passages, conduits, or tubes 84, 86; water spills from the internal passages, conduits, or tubes 84, 86 into the middle passage(s), conduit(s), or tube(s) 88 and a siphon is created since internal passages, conduits, or tubes 84, 86 and 88 have a top portion 77 of the siphon system 68 and are generally not subject to atmospheric pressure (or generally not open to air). Water then flows through the middle passage(s), conduit(s), or tube(s) 88; the rate of which is determined by the height of water in internal space 70, the size of the middle passage(s), conduit(s), or tube(s) 88; and the size of the discharge opening 80 from the siphon system 68. Water is conveyed through the discharge opening 80 into a discharge area 82 of the siphon system 68 and then into the outlet pipe or conduit 18. The use of the siphon system 68 restricts or prevents the water from directly entering the outlet pipe or conduit 18, thereby allowing water to build in the internal holding area 28 and the internal space 70, providing detention, and increasing removal of floatables and solids.

To prevent upstream flooding, the internal wall 72 of the siphon system 68 does not extend to the top portion 56 of the outer enclosure 52 of the water discharging assembly 50. If water reaches the top portion 73 of the internal wall 72, water, which may also be referred to as water overflow, may then flow over the internal wall 72 directly to the discharge area 82 and into the outlet pipe or conduit 18. Accordingly, the top portion 73 of internal wall 72 acts as an emergency spillway regulating the maximum water level height in internal holding area of the water detention structure 12. Water may continue to be discharged through the siphon system 68 during overflow periods, and the siphon system 68 may continue to operate until the water level in the internal holding area 28 and the internal space 70 is in equilibrium with the water level in the discharge area 82.

The water discharging assembly 50 is typically sealed to structure or side wall 14, thereby preventing air in the water detention structure 12 from reaching the outlet conduit 18. If there are no or little interactions with the atmosphere downstream of outlet conduit 18, an airlock may be created in the water discharging assembly 50, thereby interfering with the operation of the water discharging assembly 50. An air check valve 94 may be disposed on the top portion 56 of the outer enclosure 52 of the water discharging assembly 50 to prevent this from occurring. If the water level in the internal space 70 reaches the top portion 73 of internal wall 72 and the water level in the discharge area 82 is above the top of the outlet conduit 18, then air trapped above the water level could impede water flow over the top portion 73 of internal wall 72. The air check valve 94 allows air to escape from the internal space 70 and/or the discharge area 82 into the internal holding area 28 to prevent the air from restricting flow over the top portion 73 of internal wall 72.

As depicted in FIG. 1, water discharging assembly 50 may further include an optional filter 96. The optional filter 96 may be disposed past the opening 60 of the outer enclosure 52 of the water discharging assembly and before siphon system 68. If present, the filter 96 may filter the water prior to entry into the siphon system 68. This may prevent undesirable solids from entering the siphon system 68. Water overflow, i.e., water flowing over the internal wall 72 directly to the discharge area 82 and into the outlet pipe or conduit 18, is not filtered by the filter 96 as such water overflow bypasses the siphon system 68. Furthermore, if for some reason the filter 96 becomes inoperable, for example plugged with materials, then the water flow may bypass, either partially or in total, the siphon system 68.

Figure 6:
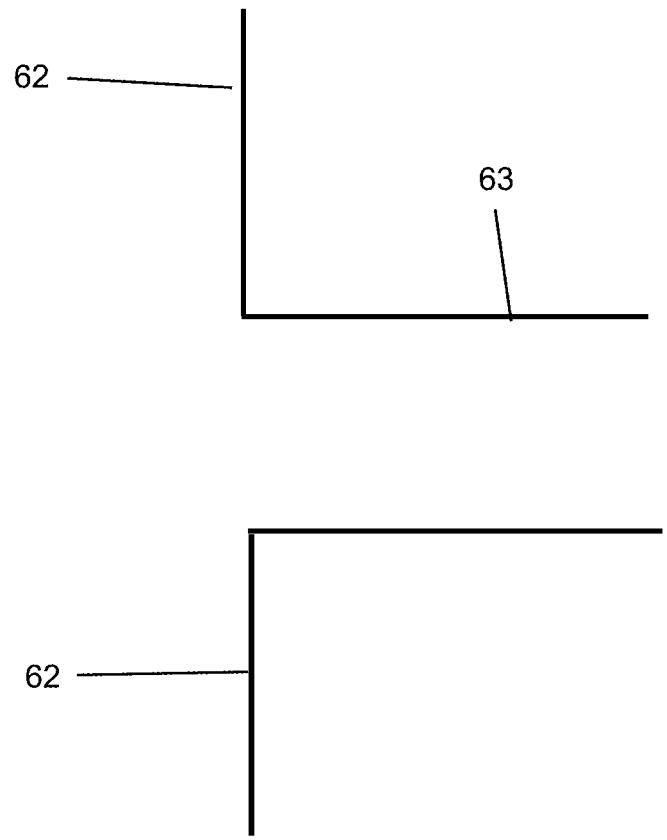
FIG. 6 is a partial side elevational view of the water discharging assembly of FIG. 3 further showing a pipe stub useful for insertion into an outlet conduit of the water detention system.

FIG. 6 is a partial side elevational view of the water discharging assembly 50 of the present invention further showing a pipe stub 63 useful for insertion into the outlet conduit 18 of the water detention system 10. In such a case the pipe stub 63 may be integral or connected to the back portion 62 of the water discharging assembly 50. The pipe stub 63 may fit over, around, or inside of the outlet conduit 18. The back portions or flanges 64, 66 may not be required with the use of the pipe stub 63, but could be included if desired.

While various embodiments of the present inventive technology are specifically illustrated and/or described herein, it will be appreciated that modifications and variations of the present inventive technology may be effected by those skilled in the art without departing from the spirit and intended scope of the inventive technology. Further, any of the embodiments or aspects of the invention as described in the claims or in the specification may be used with one and another without limitation.

The following aspects, embodiments, and the like of the invention or inventive technology, which are labelled as clauses below, are part of the detailed description for the present invention and may be combined in any fashion and combination and be within the scope of the present invention, as follows:

Clause 1. A water detention system (10) for detaining storm water comprising:

a water detention structure (12) comprising a side wall (14), a top ceiling (30), and a bottom floor (24), thereby configured to provide a static holding area (28) therein;

a storm water entry (11) for ingress of storm water into the holding area (28);

a water discharging assembly (50) configured to pass storm water there through, the water discharging assembly (50) comprising a siphon (68); and an outlet conduit (18) for egress of storm water from the water discharging assembly (50), the outlet conduit (18) being disposed through the side wall (14).

Clause 2. The water detention system (10) of any previous clause, preferably clause 1, wherein the water detention structure (12) is a catch-basin or a drainage manhole.

Clause 3. The water detention system (10) of any previous clause, preferably clause 1, wherein the storm water entry (11) is selected from the group consisting of an inlet conduit (16) disposed through the side wall (14), a top opening (32) through the top ceiling (30), and combinations thereof.

Clause 4. The water detention system (10) of any previous clause, preferably clause 1, wherein the static holding area (28) for storm water is disposed below the outlet conduit (18), above the bottom floor (24), and between portions of the side wall (14).

Clause 5. The water detention system (10) of any previous clause, preferably clause 1, wherein the siphon (68) is an automatically acting siphon.

Clause 6. The water detention system (10) of any previous clause, preferably clause 1, wherein the siphon is a bell siphon.

Clause 7. The water detention system (10) of any previous clause, preferably clause 1, wherein the water discharging assembly (50) further comprises an outer enclosure (52);

wherein the outer enclosure (52) has an opening (60) for ingress of water from the holding area (28);

wherein the outer enclosure (52) has an opening (82') for egress of water into the outlet conduit (18); and wherein the water discharging assembly (50) is configured to substantially prevent water from bypassing the water discharging system (50) and directly entering into the outlet conduit (18).

Clause 8. The water detention system (10) of clause 7, wherein the outer enclosure (52) further comprises back portions (62, 64, 66); and wherein the back portions (62, 64, 66) are adjacently juxtaposed to portions of the side wall (14) surrounding the outlet conduit (18).

Clause 9. The water detention system (10) of clause 8, wherein the back portions (62, 64, 66) of the water discharging assembly are sealed to portions of the side wall (14) surrounding the outlet conduit (18).

Clause 10. The water detention system (10) of clause 8, wherein the back portions (62, 64, 66) further comprise a pipe stub (63); and wherein the pipe stub (63) is configured to be disposed within, or around, the outlet conduit (18).

Clause 11. The water detention system (10) of any previous clause, preferably clause 1, wherein the siphon (68) comprises at least one internal water-receiving conduit (84, 86) for ingress of water, the at least one internal water-receiving conduit (84, 86) having an open bottom portion (84", 86") for receiving water and a top portion (84', 86');

wherein the siphon (68) comprises at least one water-discharging conduit (88) for egress of water, the at least one water-discharging conduit (88) having a top portion (88') in fluid communication with the top portion (84', 86') of the at least one internal water receiving conduit (84, 86) for receiving water therefrom, the at least one water-discharging conduit (88) having a discharge opening (80) to define a discharge area (82) for the siphon (68); and wherein a top wall portion (77) of the siphon (68) is enclosingly disposed above the top portion (84'. 86') of the at least one internal water-receiving conduit (84, 86) and the top portion (88') of the at least one water-discharging conduit (88).

Clause 12. The water detention system (10) of any previous clause, preferably clause 11, wherein the siphon (68) comprises at least two internal water-receiving conduits (84, 86) for ingress of water.

Clause 13. The water detention system (10) of any previous clause, preferably clause 11, wherein the siphon (68) further comprises a vertical wall (78) opposed from a vertical wall (54) of the water discharging assembly (50), thereby defining an internal space (70) within the water discharging assembly (50); and wherein water disposed within the internal space (70) between the vertical wall (78) of the siphon (68) and the vertical wall (54) of the water discharging assembly (50) is in fluid communication with the open bottom of the at least one internal water-receiving conduit (84, 86) of the siphon (68).

Clause 14. The water detention system of clause 13, wherein the internal space (70) between the vertical wall (78) of the siphon (68) and the vertical wall (54) of the water discharging assembly (50) is in fluid communication with the discharge area (82) for the siphon (68).

Clause 15. The water detention system of clause 13 or 14, wherein the siphon (68) further comprises an internal wall (72) having a top portion (73) extending above the top wall portion (77) disposed above the top portion (84'. 86') of the at least one internal water-receiving conduit (84, 86) and the top portion (88') of the at least one water-discharging conduit (88) of the siphon (68) to provide an overflow area for water to bypass the siphon (68).

Clause 16. A water discharging assembly (50) for discharging storm water from a water detention system, comprising:

an outer enclosure (52);

a first opening (60) in the outer enclosure (52) for ingress of water;

a second opening (82') in the outer enclosure (52) for egress of water; and a siphon (68) disposed within the outer enclosure (52);

wherein, except for the first opening (60) and the second opening (82'), the outer enclosure (52) is substantially fluid tight.

Clause 17. The water discharging assembly (50) of clause 16, wherein the siphon (68) comprises at least one internal water-receiving conduit (84, 86) for ingress of water, the at least one internal water-receiving conduit (84, 86) having an open bottom portion (84", 86") for receiving water and a top portion (84', 86');

wherein the siphon (68) comprises at least one water-discharging conduit (88) for egress of water, the at least one water-discharging conduit (88) having a top portion (88') in fluid communication with the top portion (84', 86') of the at least one internal water receiving conduit (84, 86) for receiving water therefrom, the at least one water-discharging conduit (88) having a discharge opening (80) to define a discharge area (82) for the siphon (68); and wherein a top wall portion (77) of the siphon (68) is enclosingly disposed above the top portion (84', 86') of the at least one internal water-receiving conduit (84, 86) and the top portion (88') of the at least one water-discharging conduit (88).

Clause 18. The water discharging assembly (50) of clauses 16-17, wherein the siphon (68) comprises at least two internal water-receiving conduits (84, 86) for ingress of water.

Clause 19. The water discharging assembly (50) of clauses 16-18, wherein the siphon (68) further comprises a vertical wall (78) opposed from a vertical wall (54) of the outer enclosure (52) of the water discharging assembly (50), thereby defining an internal space (70) within the water discharging assembly (50); and wherein water disposed within the internal space (70) between the vertical wall (78) of the siphon (68) and the vertical wall (54) of the water discharging assembly (50) is in fluid communication with the open bottom of the at least one internal water-receiving conduit (84, 86) of the siphon (68).

Clause 20. The water discharging assembly (50) of clause 19, wherein the internal space (70) between the vertical wall (78) of the siphon (68) and the vertical wall (54) of the water discharging assembly (50) is in fluid communication with the discharge area (82) for the siphon (68).

The invention claimed is:

1. A water detention system for detaining storm water comprising:

a water detention structure comprising a side wall, a top ceiling, and a bottom floor, thereby configured to provide a static holding area therein;

a storm water entry for ingress of storm water into the holding area;

a water discharging assembly configured to pass storm water there through, the water discharging assembly comprising a siphon; and an outlet conduit for egress of storm water from the water discharging assembly, the outlet conduit being disposed through the side wall;

wherein the siphon comprises at least one internal water-receiving conduit for ingress of water, the at least one internal water-receiving conduit having an open bottom portion for receiving water and an open top portion;

wherein the siphon comprises at least one water-discharging conduit for egress of water, the at least one water-discharging conduit having an open top portion in fluid communication with the open top portion of the at least one internal water receiving conduit for receiving water therefrom, the at least one water-discharging conduit having a discharge opening at a bottom portion to define a discharge area for the siphon; and wherein a top wall portion of the siphon is enclosingly disposed above the top open portion of the at least one internal water-receiving conduit and the top open portion of the at least one water-discharging conduit to seal the top open portions against atmospheric pressure or air within the holding area.

2. The water detention system of claim 1, wherein the water detention structure is a catch-basin or a drainage manhole.

3. The water detention system of claim 1, wherein the storm water entry is selected from the group consisting of an inlet conduit disposed through the side wall, a top opening through the top ceiling, and combinations thereof.

4. The water detention system of claim 1, wherein the static holding area for storm water is disposed below the outlet conduit, above the bottom floor, and between portions of the side wall.

5. The water detention system of claim 1, wherein the siphon is an automatically acting siphon.

6. The water detention system of claim 1, wherein the siphon is a bell siphon.

7. The water detention system of claim 1,
wherein the water discharging assembly further comprises an outer enclosure;
wherein the outer enclosure has an opening for ingress of water from the holding area;
wherein the outer enclosure has an opening for egress of water into the outlet conduit; and
wherein the water discharging assembly is configured to substantially prevent water from bypassing the water discharging system and directly entering into the outlet conduit.

8. The water detention system of claim 7, wherein the outer enclosure further comprises back portions; and wherein the back portions are adjacently juxtaposed to portions of the side wall surrounding the outlet conduit.

9. The water detention system of claim 8, wherein back portions of the water discharging assembly are sealed to portions of the side wall surrounding the outlet conduit.

10. The water detention system of claim 8, wherein the back portions further comprise a pipe stub; and wherein the pipe stub is configured to be disposed within, or around, the outlet conduit.

11. The water detention system of claim 1,
wherein the siphon comprises at least two internal water-receiving conduits for ingress of water.

12. The water detention system of claim 1,
wherein the siphon further comprises a vertical wall opposed from a vertical wall of the water discharging assembly, thereby defining an internal space within the water discharging assembly; and
wherein water disposed within the internal space between the vertical wall of the siphon and the vertical wall of the water discharging assembly is in fluid communication with the open bottom of the at least one internal water-receiving conduit of the siphon.

13. The water detention system of claim 12,
wherein the internal space between the vertical wall of the siphon and the vertical wall of the water discharging assembly is in fluid communication with the discharge area for the siphon.

14. The water detention system of claim 12, wherein the siphon further comprises an internal wall having a top portion extending above the top wall portion disposed above the top portion of the at least one internal water-receiving conduit and the top portion of the at least one water-discharging conduit of the siphon to provide an overflow area for water to bypass the siphon.

15. A water discharging assembly for discharging storm water from a water detention system, comprising:
an outer enclosure;
a first opening in the outer enclosure for ingress of water;
a second opening in the outer enclosure for egress of water; and
a siphon disposed within the outer enclosure;
wherein, except for the first opening and the second opening, the outer enclosure is substantially fluid tight;
wherein the siphon comprises at least one internal water-receiving conduit for ingress of water, the at least one internal water-receiving conduit having an open bottom portion for receiving water and an open top portion;
wherein the siphon comprises at least one water-discharging conduit for egress of water, the at least one water-discharging conduit having an open top portion in fluid communication with the open top portion of the at least one internal water receiving conduit for receiving water therefrom, the at least one water-discharging conduit having a discharge opening at a bottom portion to define a discharge area for the siphon; and
wherein a top wall portion of the siphon is enclosingly disposed above the top open portion of the at least one internal water-receiving conduit and the top open portion of the at least one water-discharging conduit to seal the top open portions against atmospheric pressure or air within the outer closure.

16. The water discharging assembly of claim 15,
wherein the siphon comprises at least two internal water-receiving conduits for ingress of water.

17. The water discharging assembly of claim 15,
wherein the siphon further comprises a vertical wall opposed from a vertical wall of the water discharging assembly, thereby defining an internal space within the water discharging assembly; and
wherein water disposed within the internal space between the vertical wall of the siphon and the vertical wall of the outer enclosure of the water discharging assembly is in fluid communication with the open bottom of the at least one internal water-receiving conduit of the siphon.

18. The water discharging assembly of claim 17,
wherein the internal space between the vertical wall of the siphon and the vertical wall of the water discharging assembly is in fluid communication with the discharge area for the siphon.

* * * * *